US008007570B2

(12) United States Patent (10) Patent No.: US 8,007,570 B2
Sonwane et al. (45) Date of Patent: Aug. 30, 2011

(54) SYSTEMS, METHODS, AND APPARATUS FOR CAPTURING $CO_2$ USING A SOLVENT

(75) Inventors: Chandrashekhar G. Sonwane, Greenville, SC (US); Samuel D. Draper, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 302 days.

(21) Appl. No.: 12/402,308

(22) Filed: Mar. 11, 2009

(65) Prior Publication Data

US 2010/0229720 A1 Sep. 16, 2010

(51) Int. Cl.
*B01D 53/14* (2006.01)
*B01D 53/62* (2006.01)
(52) U.S. Cl. ............... 95/183; 95/188; 95/206; 95/236; 96/234; 96/240; 96/242; 423/229
(58) Field of Classification Search .............. 96/155, 96/218, 234, 240, 242; 95/149, 156, 159, 95/178, 183, 188, 193, 194, 206, 209, 236, 95/241; 423/220, 228, 229
See application file for complete search history.

(56) References Cited

U.S. PATENT DOCUMENTS

| | | | |
|---|---|---|---|
| 4,198,386 A * | 4/1980 | Laslo et al. ............. | 423/574.1 |
| 4,444,571 A | 4/1984 | Matson | |
| 4,533,373 A * | 8/1985 | Butz et al. ............. | 62/625 |
| 5,910,611 A | 6/1999 | Gregory, Jr. et al. | |
| 6,890,497 B2 | 5/2005 | Rau et al. | |
| 7,267,775 B2 * | 9/2007 | Baudot et al. ............. | 210/652 |
| 7,288,136 B1 | 10/2007 | Gray et al. | |
| 2006/0112696 A1 | 6/2006 | Lynghjem et al. | |

FOREIGN PATENT DOCUMENTS

| | | |
|---|---|---|
| DE | 3444252 A1 | 6/1985 |
| DE | 4109267 C1 | 10/1992 |
| WO | 2009105472 A1 | 8/2009 |

OTHER PUBLICATIONS

Machine-generated translation of DE 4109267 C1, published Oct. 1992.*
European Search Report and Written Opinion issued in connection with corresponding EP10155718, Jul. 23, 2010.

* cited by examiner

*Primary Examiner* — Frank M Lawrence
(74) *Attorney, Agent, or Firm* — Sutherland Asbill & Brennan LLP

(57) ABSTRACT

Systems, methods, and apparatus for capturing $CO_2$ using a solvent are provided. A gas that includes carbon dioxide may be mixed with a solvent that is operable to absorb at least a portion of the carbon dioxide from the gas. The solvent containing the carbon dioxide may be provided to at least one removal system operable to remove at least a portion of the liquid contained in the solvent. The solvent output by the removal system may be stripped to extract at least a portion of the carbon dioxide from the solvent.

17 Claims, 3 Drawing Sheets

SYSTEMS, METHODS, AND APPARATUS FOR CAPTURING $CO_2$ USING A SOLVENT

FIELD OF THE INVENTION

This invention generally relates to the capture of carbon dioxide ($CO_2$) and more specifically, to systems, methods, and apparatus for capturing $CO_2$ using a solvent.

BACKGROUND OF THE INVENTION

As society becomes more conscious of global warming, attempts have been made to reduce the amount of carbon dioxide ($CO_2$) that is emitted into the atmosphere. In fossil fuel burning applications and systems, such as fossil fuel burning power plants, attempts have been made to capture $CO_2$ at various points in time during the operating cycle of the various applications and systems. The primary area in which conventional $CO_2$ capture systems are utilized is in the collection or capture of $CO_2$ from the exhaust gas of a fossil fuel burning power plant. Typically, the exhaust of a power plant is treated with an amine liquid that collects the $CO_2$ included in the exhaust. The amine liquid is then heated or stripped to remove the $CO_2$ that is included in the liquid.

In conventional $CO_2$ capture systems, a relatively large amount of energy is utilized to heat the amine liquid to remove the included $CO_2$. There is typically a large amount of water included in the amine liquid that must be heated along with the solvent and $CO_2$. Because a large amount of energy is expended to heat the $CO_2$, the solvent, and the water, conventional $CO_2$ capture systems are relatively inefficient and, as a result, often not cost effective.

Accordingly, there is a need for improved systems, methods, and apparatus for capturing $CO_2$, for example, by using a solvent or an aqueous solvent. There is additionally a need for improved systems, methods, and apparatus for removing $CO_2$ from a solvent or an aqueous solvent.

BRIEF DESCRIPTION OF THE INVENTION

Some or all of the above needs and/or problems may be addressed by certain embodiments of the invention. Embodiments of the invention may include systems, methods, and apparatus for capturing $CO_2$ using a solvent, such as an aqueous solvent. According to one embodiment of the invention, a method for capturing carbon dioxide is provided. A gas that includes carbon dioxide may be mixed with a solvent that is operable to absorb at least a portion of the carbon dioxide from the gas. The solvent containing the carbon dioxide may be provided to at least one removal system operable to remove at least a portion of the liquid contained in the solvent. The solvent output by the removal system may be stripped to extract at least a portion of the carbon dioxide from the solvent.

According to another embodiment of the invention, a system for capturing carbon dioxide is provided. The system may include an absorber, at least one removal system, and a stripper. The absorber may be operable to receive a gas that includes carbon dioxide and to mix the gas with a solvent. The solvent may absorb at least a portion of the carbon dioxide. The at least one removal system may be operable to receive the solvent including absorbed carbon dioxide from the absorber and may be further operable to remove at least a portion of the liquid contained in the solvent. The stripper may be operable to heat the solvent output by the removal system to extract at least a portion of the carbon dioxide from the solvent.

According to yet another embodiment of the invention, a method for capturing carbon dioxide is provided. A gas that includes carbon dioxide may be mixed with a solvent that absorbs at least a portion of the carbon dioxide from the gas. At least a portion of the liquid may be removed from the solvent that includes absorbed carbon dioxide. The solvent may be stripped after at least a portion of the liquid has been removed in order to extract at least a portion of the carbon dioxide from the solvent.

Other embodiments, aspects, and features of the invention will become apparent to those skilled in the art from the following detailed description, the accompanying drawings, and the appended claims.

BRIEF DESCRIPTION OF THE DRAWINGS

Figure 1:
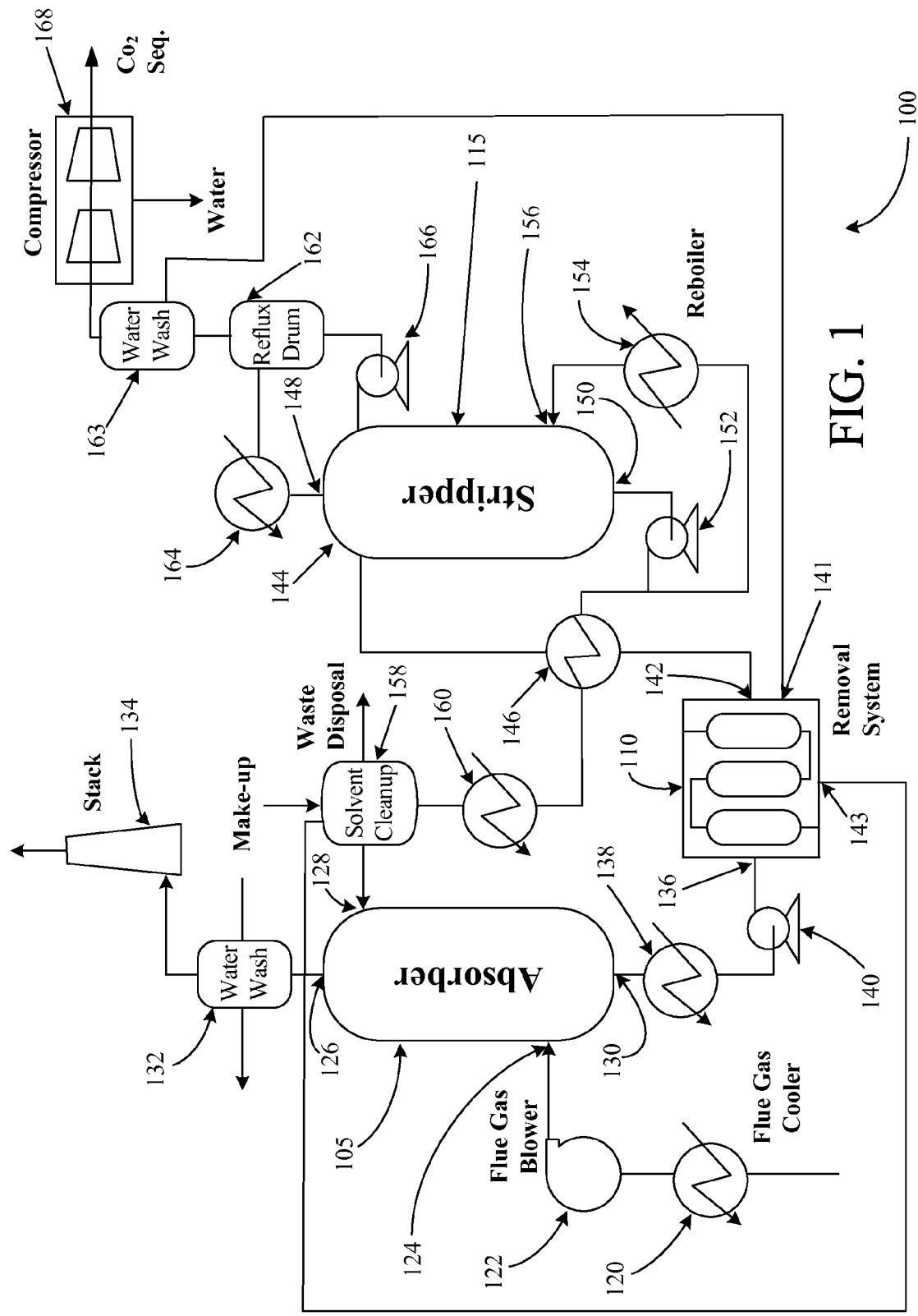

Having thus described the invention in general terms, reference will now be made to the accompanying drawings, which are not necessarily drawn to scale, and wherein:

FIG. 1 is a schematic diagram of one example system that may be utilized to capture $CO_2$, according to an illustrative embodiment of the invention.

Figure 2:
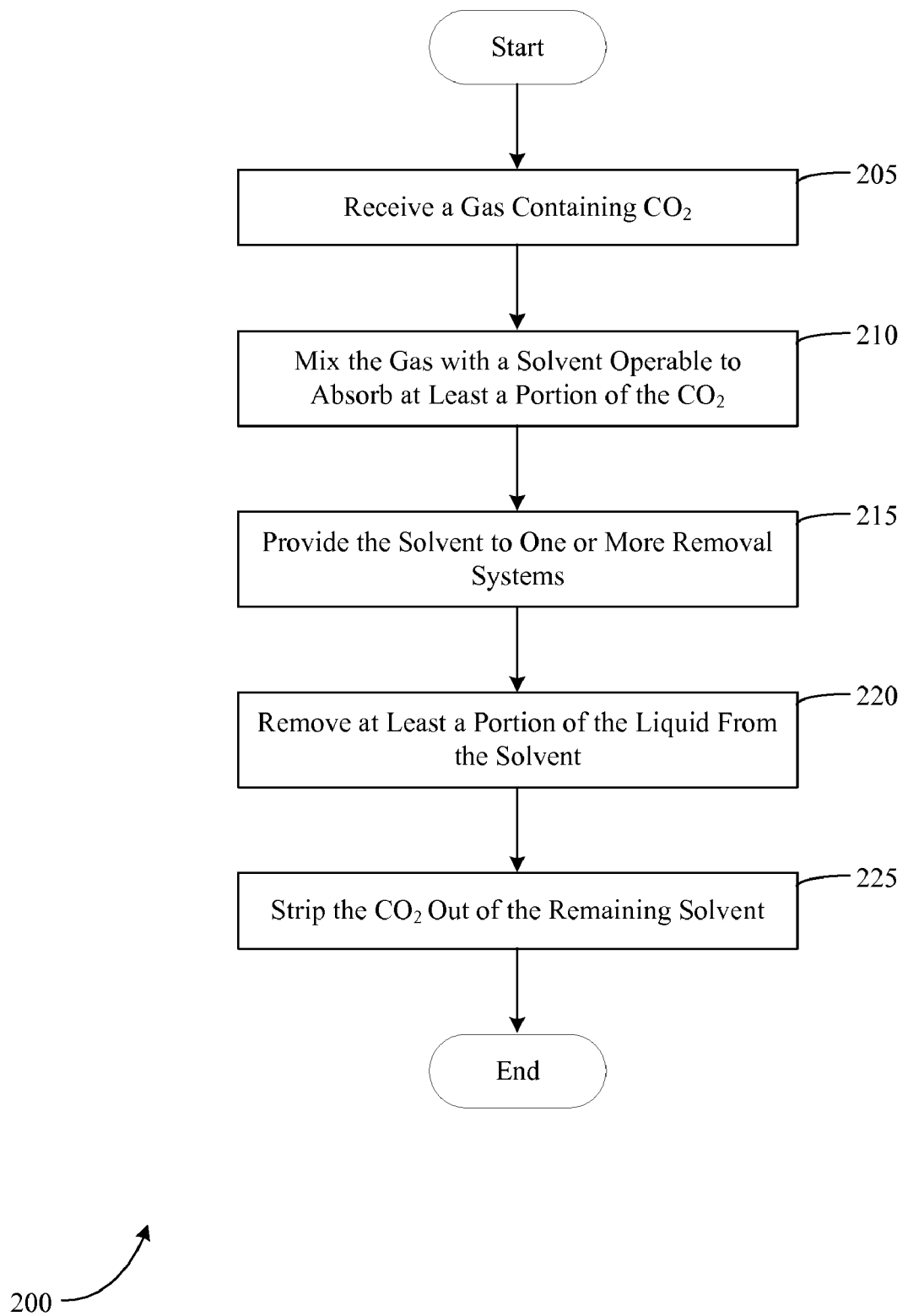

FIG. 2 is a flow chart of one example method for capturing $CO_2$ using an solvent, according to an illustrative embodiment of the invention.

Figure 3:
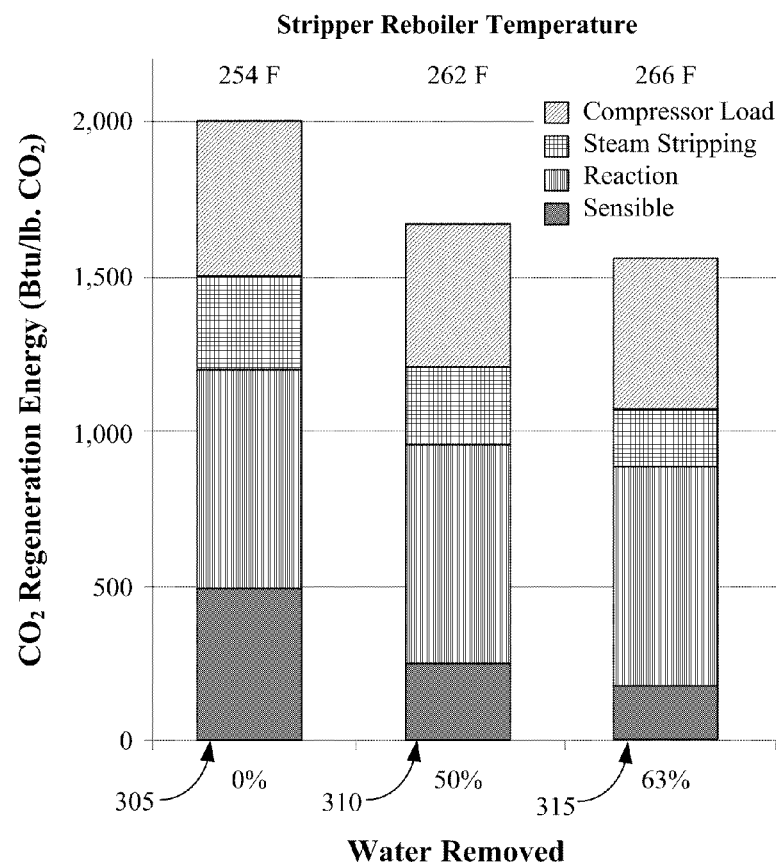

FIG. 3 is a chart illustrating example energy savings that may be obtained by utilizing various embodiments of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems, methods, and apparatus for capturing $CO_2$ using a solvent, such as an aqueous solvent. A gas that includes $CO_2$, such as the exhaust of a fossil fuel burning power plant, may be provided to an absorber. In the absorber, the gas may interact with a solvent that absorbs $CO_2$ that is included in the gas to form a $CO_2$ rich solvent. The $CO_2$ rich solvent may be processed through one or more suitable removal systems or removal devices to remove at least a portion of the liquid included in the $CO_2$ rich solvent. After being processed by the removal system(s) or liquid removal system(s), the $CO_2$ rich solvent may be passed to a stripper that separates the $CO_2$ from the solvent, and the separated $CO_2$ may be captured and/or sent for sequestration. The efficiency of the stripper may be improved by supplying the solvent to the stripper after a portion of the liquid has been removed. In this regard, the amount of energy utilized in the capture and/or regeneration of the $CO_2$ may be reduced.

Embodiments of the invention may be utilized in association with a wide variety of different applications as desired. Examples of applications that may be utilized in association with embodiments of the invention include fossil fuel burning power plants and systems, such as, coal power plants, natural gas power plants, oil power plants, coal powered systems, natural gas powered systems, and oil powered systems, etc. The burning of fossil fuels may lead to the release and/or emission of $CO_2$ that may be desirable to capture by certain embodiments of the invention.

FIG. 1 is a schematic diagram of one example system 100 that may be utilized to capture $CO_2$, according to an illustrative embodiment of the invention. The system 100 may include, among other components, an absorber 105, a removal system 110 or liquid removal system, and a stripper 115.

The absorber 105 may be a component of the system 100 that is operable to expose a gas containing $CO_2$ to a solvent, such as an aqueous solvent. In a power plant application, the absorber 105 may include a chamber that receives a supply of flue gas, for example, gas that is given off from the burning of a fossil fuel. The flue gas may include $CO_2$, and it may be desirable to remove at least a portion of the $CO_2$ before emitting the flue gas to the atmosphere. In certain embodiments of the invention, the flue gas may be provided directly to the absorber 105. In other embodiments of the invention, the flue gas may be passed through other components of the system 100 before being provided to the absorber 105. For example, the flue gas may be passed through a heat exchanger 120 or other suitable component that is operable to alter the temperature of the flue gas. In certain embodiments, the heat exchanger 120 may be a flue gas cooler that is operable to cool the flue gas to a desired temperature to be received by the absorber 105. For example, the temperature of the flue gas may be reduced from approximately 130 degrees Fahrenheit to a temperature between approximately 70 to approximately 90 degrees Fahrenheit.

As another example, the flue gas may be passed through a blower 122 or other suitable component that is operable to alter the pressure of the flue gas prior to the flue gas being provided to the absorber 105. As shown in FIG. 1, in certain embodiments, the blower 122 may increase the pressure of the flue gas by a few pounds per square inch (psi) prior to the flue gas being provided to the absorber 105. For example, the blower 122 may increase the pressure of the flue gas by approximately one to approximately three psi prior to the flue gas being provided to the absorber 105.

In certain embodiments of the invention, the flue gas may be provided to an inlet 124 of the absorber 105 at the base of the absorber or near the base of the absorber 105. The flue gas may rise inside the absorber 105 to an outlet 126 at the top of the absorber 105. Additionally, a solvent, such as an aqueous solvent, may be sprayed or otherwise released from the top or near the top of the absorber 105, and the solvent may fall towards the base of the absorber 105. The solvent may be supplied via a solvent inlet 128. In one embodiment of the invention, a shower spray of solvent may be released at or near the top of the absorber 105. The solvent may contact the flue gas within the absorber 105 and react with the flue gas. During the reaction with the flue gas, the solvent may absorb $CO_2$ from the flue gas. After absorbing $CO_2$, the solvent may be referred to as a $CO_2$ rich solvent. The $CO_2$ rich solvent may fall to the bottom of the absorber 105 and exit the absorber via a $CO_2$ rich solvent or $CO_2$ rich stream outlet 130.

As stated above, the flue gas may exit through the outlet 126 at the top of the absorber 105. The flue gas exiting the absorber 105 may include some solvent that did not fall to the bottom of the absorber 105. In certain embodiments of the invention, the flue gas exiting the absorber may be passed through a water wash component 132 that washes out any escaping solvent. The flue gas may then be output to the atmosphere via an appropriate stack 134, such as a smoke stack associated with a power plant. As desired in various embodiments, the stack 134 may include any number of scrubbers and/or other components that further clean the flue gas. However, as a relatively large portion of the $CO_2$ included in the flue gas has already been removed, a relatively smaller stack 134 may be utilized in embodiments of the invention, thereby reducing costs associated with building a power plant.

A wide variety of solvents, including aqueous solvents, may be utilized as desired in various embodiments of the invention. Any solvent that is capable of absorbing $CO_2$ may be utilized. One example of a suitable solvent is an aqueous solution of monoehtanol amine (MEA) and water. Any mixture of MEA and water may be utilized as desired in various embodiments of the invention, for example, a mixture of approximately 30% MEA and approximately 70% water. Other examples of suitable solvents, include but are not limited to, pure or mixtures of methylmonoethanolamine (MMEA), dimethylmonoethanolamine, and/or methylaminopropanol (AMP). Suitable solvents may be water-based or aqueous solvents in certain embodiments of the invention. In other embodiments, another suitable liquid, such as alcohol, may form the base of a solvent, such as, alcohol.

According to an aspect of the invention, the $CO_2$ rich stream that is output from the absorber 105 via the $CO_2$ rich stream outlet 130 may be provided to any number of removal systems 110 or liquid removal systems prior to being provided to the stripper 115. The removal system(s) 110 may be operable to remove at least a portion of the liquid from the $CO_2$ rich stream prior to the $CO_2$ rich stream being provided to the stripper 115. In this regard, the energy required in the stripper 115 to remove the $CO_2$ from the $CO_2$ rich stream may be reduced, thereby leading to greater efficiency within the system 100.

In certain embodiments of the invention, the $CO_2$ rich stream exiting through the $CO_2$ rich stream outlet 130 may be directly provided to an inlet 136 of the removal system(s) 110. In other embodiments, the $CO_2$ rich stream may be passed through one or more other components of the system 100 before being provided to the removal system(s) 110. The other components may alter any number of characteristics associated with the $CO_2$ rich stream. For example, as shown in FIG. 1, the $CO_2$ rich stream may be passed through a heat exchanger 138 or other suitable component that is operable to alter the temperature of the $CO_2$ rich stream. In certain embodiments, the heat exchanger 138 may alter the temperature of the $CO_2$ rich stream to a desired temperature for providing the $CO_2$ rich stream to the removal system(s) 110. For example, the temperature of the $CO_2$ rich stream may be reduced to a temperature between approximately 70 to approximately 90 degrees Fahrenheit before the $CO_2$ rich stream is supplied to the removal system(s) 110. The desired temperature may be determined based upon the specifications and/or operating conditions associated with the removal system(s) 110.

A wide variety of removal system(s) 110 and/or liquid removal techniques may be utilized as desired in various embodiments of the invention. Examples of suitable removal systems and/or techniques include, but are not limited to, desalination processes, reverse osmosis liquid removal systems, membrane-based liquid removal systems, ion exchange processes, partial boiling of the $CO_2$ rich stream, etc.

A reverse osmosis liquid removal system may be a system that utilizes pressure to force the $CO_2$ rich stream through a membrane in order to separate liquid from the $CO_2$ rich stream. For example, with an aqueous solvent, water and/or excess solvent may be separated from the $CO_2$ rich stream. Pressure greater than the osmotic pressure for the $CO_2$ rich solvent and the remaining liquid may be utilized to force the $CO_2$ rich stream through a membrane, where the $CO_2$ rich solvent is retained on one side of the membrane and the remaining liquid is allowed to pass through the membrane.

Alternatively, the $CO_2$ rich solvent may be passed through the membrane while the remaining liquid is retained on the other side of the membrane. In this regard, at least a portion of the liquid may be removed from the $CO_2$ rich stream.

A membrane-based removal system may include one or more membranes that separate liquid, such as excess solvent and/or water, from the $CO_2$ rich stream. A wide variety of different membranes may be utilized as desired in various embodiments of the invention, for example, polymer type membranes. In operation, certain components of the $CO_2$ rich stream may be allowed to pass through a membrane while other components of the $CO_2$ rich stream are prevented from passing through the membrane. For example, water and/or excess solvent may be passed through a membrane while a $CO_2$ rich solvent is not allowed to pass through the membrane. In this regard, a membrane may selectively permeate a particular component, such as water, from the $CO_2$ rich solvent.

In certain embodiments, partial boiling of the $CO_2$ rich stream may be combined with a membrane-based removal system or process. The partial boiling may be operable to remove at least a portion of the liquid, such as water, from the $CO_2$ rich stream as steam and/or vapor. The $CO_2$ rich stream may be heated to a point where at least a portion of the liquid from the $CO_2$ rich stream is converted to steam or vapor so that it can be removed. Additionally or alternatively, partial boiling of the $CO_2$ rich stream may be utilize to convert at least a portion of the $CO_2$ included in the $CO_2$ rich stream to a $CO_2$ gas that may be siphoned off.

In certain embodiments of the invention, one or more pumps 140 may be utilized to pump the $CO_2$ rich stream into a removal system 110. For example, with membrane-based or reverse osmosis removal systems 110, the $CO_2$ rich stream may be pumped into the removal system 110 in order to force the $CO_2$ rich stream through the removal system 110.

In addition to removing liquid from the $CO_2$ rich stream, a removal system 110 may be operable to remove particulates and/or particles from the $CO_2$ rich stream. For example, certain particulates may be separated from the $CO_2$ rich stream by one or more membranes associated with a removal system 110. Additionally or alternatively, one or more filters may be provided in the system 100 to remove particulates from the $CO_2$ rich stream. For example, one or more filters may be utilized to remove particulates from the $CO_2$ rich stream prior to providing the $CO_2$ rich stream to a removal system 110. In this regard, damage that may be caused to the removal system 110 by the particulates, such as a particulate damaging a membrane, may be reduced or eliminated.

In certain embodiments of the invention, the portions of the $CO_2$ rich stream that are removed by the removal system(s) 110 may be provided to other portions of the system 100. For example, the liquid, such as excess solvent and/or water, that is removed by the removal system(s) may be provided to the solvent cleanup system or component 158 that is discussed in greater detail below. The liquid may exit the removal system(s) 110 at a removed liquid exit 143, and the liquid may be provided to the solvent cleanup system or component 158. In this regard, any removed solvent may be retained for further use by the system 100.

As another example, one or more gases may be separated from the $CO_2$ rich stream by the removal system(s) 110. The removal of liquid from the $CO_2$ rich stream may, in some instances, separate $CO_2$ and/or other vapors from the $CO_2$ rich stream. These gases may be output from the removal systems at a gas outlet 141, and the gases may be provided to another component of the system 100. For example, the gases may be provided to the water wash component 163 that is discussed in greater detail below. In this regard, the $CO_2$ included in the gases may be captured by the system 100.

After being processed by the removal system(s) 110, the $CO_2$ rich stream may be output via a removal system outlet 142 and supplied to a $CO_2$ rich stream inlet 144 of the stripper 115. In certain embodiments, the $CO_2$ rich stream may be provided directly to the stripper 115 after being output by the removal system(s) 110. In other embodiments, the $CO_2$ rich stream may be passed through one or more other components of the system 100 before being provided to the stripper 115. The other components may alter any number of characteristics associated with the $CO_2$ rich stream. For example, as shown in FIG. 1, the $CO_2$ rich stream may be passed through a heat exchanger 146 or other suitable component that is operable to alter the temperature of the $CO_2$ rich stream. The heat exchanger 146 shown in FIG. 1 may be operable to increase the temperature of the $CO_2$ rich stream utilizing a $CO_2$ lean stream that is output by the stripper 115. As the stripper 115 increases the temperature of the solution provided to the stripper in order to remove $CO_2$, the $CO_2$ lean stream that is output by the stripper 115 may have a temperature greater than that of the $CO_2$ rich stream output by the removal system(s). Thus, the heat exchanger 146 may utilize the $CO_2$ lean stream to increase the temperature of the $CO_2$ rich stream before the $CO_2$ rich stream is provided to the stripper 115. In this regard, the amount of energy required by the stripper 115 to heat the $CO_2$ rich stream may be reduced.

After the $CO_2$ rich stream is provided to the stripper 115, the stripper 115 may be operable to strip the $CO_2$ rich stream in order to remove the $CO_2$ from the solvent. In certain embodiments that utilize an aqueous solvent, the stripper 115 may heat the $CO_2$ rich stream to a temperature greater than the boiling point of $CO_2$, and water in order to remove the $CO_2$ and any remaining water from the solvent as a $CO_2$ gas and water vapor or steam. A wide variety of strippers may be utilized as desired in various embodiments of the invention. For example, the stripper 115 may include one or more heating trays that are operable to hold and strip the $CO_2$ rich stream as it is passed through the stripper 115. The $CO_2$ gas and water vapor may be output from the stripper 115 via a gas outlet 148 at or near the top of the stripper 115. The remaining solvent may then be output from the stripper 115 via a solvent outlet 150 at or near the bottom of the stripper 115.

According to an aspect of the invention, the energy required to heat the $CO_2$ rich stream within the stripper 115 may be reduced due to the removal of liquid from the $CO_2$ rich stream by the removal system(s) 110. In conventional systems, a stripper 115 must provide enough energy to boil both the $CO_2$ included in the $CO_2$ rich stream as well as the water and excess solvent included in the rich stream. Thus, due to the removal of liquid from the $CO_2$ rich stream by the removal system(s) 110, less energy is expended by the stripper 115 to heat the $CO_2$ rich stream. In this regard, the efficiency associated with the system 100 may be improved and the cost associated with operating the system 100 may be reduced. Some example figures of the energy savings that may be provided by various embodiments of the invention are discussed in greater detail below with reference to FIG. 3.

The solvent exiting the stripper 115 via the solvent outlet 150 may have a relatively low concentration of $CO_2$ and, therefore, may be referred to as a $CO_2$ lean stream. For example, the $CO_2$ lean stream may have include less than approximately 5% of $CO_2$ while the $CO_2$ rich stream may include approximately 10% or more $CO_2$. The $CO_2$ lean stream may be provided to one or more pumps 152 that pump the $CO_2$ lean stream to one or more other components of the system 100. As shown in FIG. 1, a portion of the $CO_2$ lean stream may be provided to a reboiler 154 that heats the $CO_2$ lean stream and supplies it to the stripper 115 via a $CO_2$ lean stream inlet 156 of the stripper 115. The $CO_2$ lean stream may be utilized to by the stripper 115 to at least partially heat $CO_2$ rich stream provided to the stripper 115.

The portion of the $CO_2$ lean stream that is not provided to the reboiler 154 may be returned to the absorber 105 to absorb additional $CO_2$. As desired in certain embodiments of the invention, the $CO_2$ lean stream may be passed through one or more other components of the system 100 before being supplied to the absorber 105. For example, the relatively hot $CO_2$ lean stream may be passed through a heat exchanger 146 to assist in heating the $CO_2$ rich stream before the $CO_2$ rich stream is provided to the stripper 115. The $CO_2$ lean stream may also be supplied to a solvent cleanup system or component 158 of the system 100 before being supplied to the absorber 105. The solvent cleanup system 158 may be operable to add fresh solvent to the $CO_2$ lean stream before the solvent is supplied to the absorber 105. In certain embodiments, the solvent cleanup system 158 may take a sample of the $CO_2$ lean stream and analyze the sample to determine whether the $CO_2$ lean stream may be recycled. If it is determined that a portion or all of the $CO_2$ lean stream may not be recycled, then at least a portion of the $CO_2$ lean stream may be output by the solvent cleanup system 158 as waste. If, however, it is determined that at least a portion of the $CO_2$ lean stream may be recycled, then a further analysis may be conducted in order to determine whether fresh solvent should be added to the $CO_2$ lean stream. If it is determined that fresh solvent should be added, then fresh solvent or make-up solvent may be added from a solvent supply before the $CO_2$ lean stream is provided to the absorber 105. If, however, it is determined that no fresh solvent is needed, then the $CO_2$ lean stream may be provided to the absorber 105 from the solvent cleanup system 158. The $CO_2$ lean stream and/or make-up solvent may be supplied to the absorber 105 via the solvent inlet 128.

In certain embodiments of the invention, the temperature of the $CO_2$ lean stream may be altered prior to supplying the $CO_2$ lean stream to the solvent cleanup system 158. As described above, the temperature of the $CO_2$ lean stream may be altered by the heat exchanger 146 that exchanges heat between the $CO_2$ lean stream and the $CO_2$ rich stream. As desired in various embodiments, the $CO_2$ lean stream may additionally or alternatively be passed through one or more other heat exchangers or other suitable components to alter the temperature of the $CO_2$ lean stream. For example, the $CO_2$ lean stream may be passed through a heat exchanger 160 that is operable to reduce the temperature of the $CO_2$ lean stream to a desired temperature associated with the solvent cleanup system 158.

The $CO_2$ gas, water vapor, and/or other vapors exiting the stripper 115 may be provided to a reflux drum 162 or reflux condenser. In certain embodiments, the temperature of the $CO_2$ gas and other vapor may be reduced by a heat exchanger 164 or other suitable device before the $CO_2$ gas and other vapor is provided to the reflux drum 162. The reflux drum 162 may condense a significant amount of the solvent and water vapor and separate $CO_2$ gas from water and solvent. The separated out water and solvent may be output from the reflux drum 162 and supplied to another component of the system 100. For example, the separated out water and solvent may be pumped back into the stripper 115 by one or more pumps 166.

The gas that is separated out by the reflux drum 162 may be provided to a water wash component 163 that washes any remaining solvent out of the gas. The gas that is output from the water wash component 163 may be supplied to a compressor 168 that removes any remaining water vapor from the $CO_2$ gas. The compressor 168 may be any suitable compressor that is operable to remove remaining water vapor from the $CO_2$ gas. For example, the compressor 168 may be a multi-stage compressor that utilizes inter-stage cooling to remove water vapor. Removed water vapor and/or water may be discarded by the compressor 168 and the remaining $CO_2$ may be output to be utilized as desired in various applications.

FIG. 2 is a flowchart of one example of a method 200 for capturing $CO_2$ utilizing a solvent, such as an aqueous solvent, according to an illustrative embodiment of the invention. The method 200 may begin at block 205. At block 205, a gas containing $CO_2$ may be received. The gas may be received from a wide variety of sources as desired in various embodiments of the invention. For example, the gas may be received as the exhaust from burning a fossil fuel in a power plant.

At block 210, the gas may be mixed with a solvent that is operable to absorb at least a portion of the $CO_2$ included in the gas. For example, the gas may be mixed with an aqueous solvent within a suitable absorber, such as the absorber 105 described above with reference to FIG. 1. A wide variety of solvents or aqueous solvents may be utilized as desired in various embodiments of the invention, such as, a monoethanol amine.

At block 215, the solvent with the absorbed $CO_2$ may be provided to one or more suitable removal systems, such as removal system(s) 110 described above with reference to FIG. 1, that are operable to remove or extract at least a portion of the liquid contained within the solvent at block 220. A wide variety of removal systems 110 may be utilized as desired in various embodiments of the invention, for example, a reverse osmosis removal system, a membrane-based removal system, or a removal system that partially boils the solvent. According to an aspect of the invention, by removing at least a portion of the liquid from the solvent, the energy that is suitable to heat the solvent to extract the $CO_2$ may be reduced.

At block 225, the remaining solvent that is output by the removal system(s) 110 may be stripped to extract the $CO_2$ from the solvent. A wide variety of suitable systems and/or devices may be utilized to strip the solvent, such as, the stripper 115 described above with reference to FIG. 1. By stripping the solvent, the $CO_2$ may be converted to a gas and extracted from the liquid solvent. In this regard, the $CO_2$ may be captured. As a result of removing at least a portion of the liquid from the solvent by the removal system(s), the energy supplied to strip the solvent may be reduced. Thus, the steam requirements of the stripper 115 may be decreased and the cost of operating the stripper 115 may be reduced. In this regard, improved systems and methods for capturing $CO_2$ may be provided.

The method 200 may end following block 225.

The operations described in the method 200 of FIG. 2 do not necessarily have to be performed in the order set forth in FIG. 2, but instead may be performed in any suitable order. Additionally, in certain embodiments of the invention, more or less than all of the operations set forth in FIG. 2 may be performed.

FIG. 3 is a chart 300 illustrating example energy savings that may be obtained by utilizing various embodiments of the invention. The chart illustrates example figures for the energy that may be suitable to capture $CO_2$ from a $CO_2$ rich solvent. Several example energy components are illustrated in FIG. 3, including energy components that are expended within a stripper and a compressor to collect $CO_2$ from a solvent, such as stripper 115 and compressor 168 illustrated in FIG. 1.

With reference to FIG. 3, example energy expenditures are illustrated for a first situation 305 in which approximately zero percent of the water and/or other liquid included in a $CO_2$ rich solvent is removed from the $CO_2$ rich solvent before the solvent is supplied to a stripper 115, a second situation 310 in which approximately 50 percent (50%) of the water and/or other liquid is removed from a $CO_2$ rich solvent before the solvent is supplied to the stripper 115, and a third situation 315 in which approximately 63 percent (63%) of the water and/or other liquid is removed from a $CO_2$ rich solvent before the solvent is supplied to the stripper 115. For each situation 305, 310, 315, approximate energy expenditures are provided for sensible energy, reaction energy, steam stripping energy, and compressor load energy.

The sensible energy may be the base energy that is expended to get a $CO_2$ rich solvent stream to a temperature at which the bond between the $CO_2$ and the solvent can be broken. The reaction energy may be the energy that is expended to break or reverse the bond between the $CO_2$ and the solvent. The steam stripping energy may be latent heat energy expended to convert the $CO_2$ solvent, and/or water in a $CO_2$ rich solvent into a gas so that the $CO_2$ can be removed from the $CO_2$ rich solvent. Finally, the compressor load energy may be the energy expended by a compressor once $CO_2$ and water are output or released by the stripper 115.

As shown in FIG. 3, the sensible energy and the steam stripping energy may be reduced as a greater amount of liquid is removed from a $CO_2$ rich solvent prior to the solvent being supplied to the stripper 115. Because less water and/or solvent must be heated within the stripper 115, less overall energy may be expended in order to heat the $CO_2$ rich solvent to remove the $CO_2$. By removing approximately 63 percent (63%) of the water and/or other liquid from the $CO_2$ rich solvent, the sensible heat energy may be reduced by approximately 64 percent (64%) and the steam stripping energy may be reduced by approximately 41 percent (41%), leading to an overall reduction in regeneration energy of approximately 29 percent (29%). By reducing the regeneration energy of the stripper 115, the cost associated with $CO_2$ capture may be reduced. For example, as the amount of energy utilized by the stripper 115 is decreased, the amount of steam that is supplied to the stripper may be decreased, thereby increasing the net efficiency of the plant and reducing the cost of electricity.

Additionally, it is noted from FIG. 3 that, even with the reduction of water and/or other liquid from a $CO_2$ rich solvent prior to supplying the $CO_2$ rich solvent to a stripper 115, the regeneration temperature utilized in the stripper 115 does not significantly increase. As shown, the regeneration temperature experiences a rather small increase from approximately 254 degrees Fahrenheit to approximately 266 degrees Fahrenheit as approximately 63 percent (63%) of the water and/or other liquid is removed from the $CO_2$ rich solvent.

Example embodiments of the invention can provide the technical effects of creating a system, method, and apparatus that reduce the energy requirements needed for $CO_2$ capture. By utilizing one or more removal systems to reduce the amount of liquid in a $CO_2$ rich solvent prior to stripping the $CO_2$ rich solvent to remove the $CO_2$, the energy requirements for stripping the solvent may be reduced. In this regard, the cost associated with $CO_2$ capture may be reduced.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for capturing carbon dioxide, the method comprising:
    mixing a gas comprising carbon dioxide with a solvent operable to absorb at least a portion of the carbon dioxide from the gas;
    providing the solvent comprising carbon dioxide to at least one removal system operable to remove at least a portion of the liquid contained in the solvent, wherein the at least one removal system partially boils the solvent; and
    stripping the solvent output by the removal system to extract at least a portion of the carbon dioxide from the solvent.

2. The method of claim 1, further comprising:
    compressing the carbon dioxide extracted from the solvent.

3. The method of claim 1, wherein the gas comprises gas emitted from burning a fossil fuel.

4. The method of claim 1, wherein the solvent comprises monoethanol amine.

5. The method of claim 1, wherein the at least one removal system comprises a reverse osmosis liquid removal system.

6. The method of claim 1, wherein the at least one removal system comprises one or more membranes operable to remove at least a portion of the liquid contained in the solvent.

7. A system for capturing carbon dioxide, the system comprising:
    an absorber operable to receive a gas comprising carbon dioxide and to mix the gas with a solvent, wherein the solvent absorbs at least a portion of the carbon dioxide;
    at least one removal system operable to receive the solvent comprising absorbed carbon dioxide from the absorber and further operable to remove at least a portion of the liquid contained in the solvent, wherein the at least one removal system partially boils the solvent; and
    a stripper operable to heat the solvent output by the removal system to extract at least a portion of the carbon dioxide from the solvent.

8. The system of claim 7, further comprising:
    a compressor operable to compress the carbon dioxide extracted from the solvent.

9. The system of claim 7, wherein the gas comprises gas emitted from burning a fossil fuel.

10. The system of claim 7, wherein the solvent comprises monoethanol amine.

11. The system of claim 7, wherein the at least one removal system comprises a reverse osmosis liquid removal system.

12. The system of claim 7, wherein the at least one removal system comprises one or more membranes operable to remove at least a portion of the liquid contained in the solvent.

13. A method for capturing carbon dioxide, the method comprising:
    mixing a gas comprising carbon dioxide with a solvent, wherein the solvent absorbs at least a portion of the carbon dioxide from the gas;
    removing at least a portion of the liquid from the solvent comprising carbon dioxide, wherein the removal comprises partially boiling the solvent; and stripping the solvent after at least a portion of the liquid is removed in order to extract at least a portion of the carbon dioxide from the solvent.

14. The method of claim 13, further comprising:

compressing the carbon dioxide extracted from the solvent.

15. The method of claim 13, wherein the solvent comprises monoethanol amine.

16. The method of claim 13, wherein removing at least a portion of the liquid from the solvent comprises removing liquid from the solvent utilizing a reverse osmosis system.

17. The method of claim 13, wherein removing at least a portion of the liquid from the solvent comprises removing liquid from the solvent utilizing one or more membranes.

* * * * *